United States Patent
Chang

(10) Patent No.: US 8,451,729 B2
(45) Date of Patent: May 28, 2013

(54) EMBEDDED DEVICE AND PACKET FORWARDING METHOD

(75) Inventor: Yao-Wen Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 336 days.

(21) Appl. No.: 12/770,760

(22) Filed: Apr. 30, 2010

(65) Prior Publication Data

US 2011/0188375 A1    Aug. 4, 2011

(30) Foreign Application Priority Data

Feb. 3, 2010   (CN) .......................... 2010 1 0301163

(51) Int. Cl.
*G01R 31/08* (2006.01)
*G06R 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......... 370/233; 370/230; 370/231; 370/232; 370/235

(58) Field of Classification Search
USPC ................................. 370/229–236
See application file for complete search history.

(56) References Cited

U.S. PATENT DOCUMENTS

| | | | |
|---|---|---|---|
| 7,599,283 B1 * | 10/2009 | Varier et al. | 370/216 |
| 2003/0123390 A1 * | 7/2003 | Takase et al. | 370/230.1 |
| 2003/0166980 A1 * | 9/2003 | Choudary et al. | 568/927 |
| 2005/0157728 A1 | 7/2005 | Kawano et al. | |
| 2006/0045011 A1 * | 3/2006 | Aghvami et al. | 370/230 |
| 2011/0141957 A1 * | 6/2011 | Lansing et al. | 370/310 |

* cited by examiner

*Primary Examiner* — Jae Y Lee
*Assistant Examiner* — Abu-Sayeed Haque
(74) *Attorney, Agent, or Firm* — Altis Law Group, Inc.

(57) ABSTRACT

An embedded device includes a wide area network (WAN) port, a plurality of local area network (LAN) ports, and a packet forwarding module to forward packets from the LAN ports to the WAN port. The packet forwarding module detects whether any packets are being dropped in the WAN port, and turns on a bandwidth classification mechanism if the packets are being dropped. The packet forwarding module classifies packets from the LAN ports into different types, and determines the amount of traffic for each type of packet in a fixed time period. The packet forwarding module further compares whether the traffic of each type of packet exceeds a predefined threshold, regards the packets within the predefined threshold as normal packets, and the packets exceeding the predefined threshold as abuse packets. The packet forwarding module drops the abuse packets, and forwards the normal packets to the WAN port.

3 Claims, 5 Drawing Sheets

EMBEDDED DEVICE AND PACKET FORWARDING METHOD

BACKGROUND

1. Technical Field

Embodiments of the present disclosure relate to embedded devices, and especially to a packet forwarding method applied in an embedded device.

2. Description of Related Art

Quality of service (QoS) mechanism is the method of providing different priorities to different applications, users, data flows, or to guarantee a certain level of performance to a data flow. For example, a required bit rate, delay, jitter, packet dropping probability and/or bit error rate may be guaranteed. The QoS mechanism is often applied in embedded devices.

In the absence of network congestion, a QoS mechanism works perfectly. However, the QoS mechanism may lead to low priority packets not being forwarded when network congestion occurs. For example, referring to FIG. 5, a traditional embedded device 10a receives packets via local area network (LAN) ports 11, and classifies the packets into A, B, C types according to different priorities. The embedded device 10a will drop some or all lower priority packets, such as C packets, if there are many high priority packets causing network congestion at the embedded device 10a. Therefore, QoS mechanism is unfair for all priority packets sometimes, and accordingly is not friendly for all users.

It is therefore desirable to design an embedded device and a packet forwarding method to overcome the above mentioned problems.

DETAILED DESCRIPTION

Figure 1:
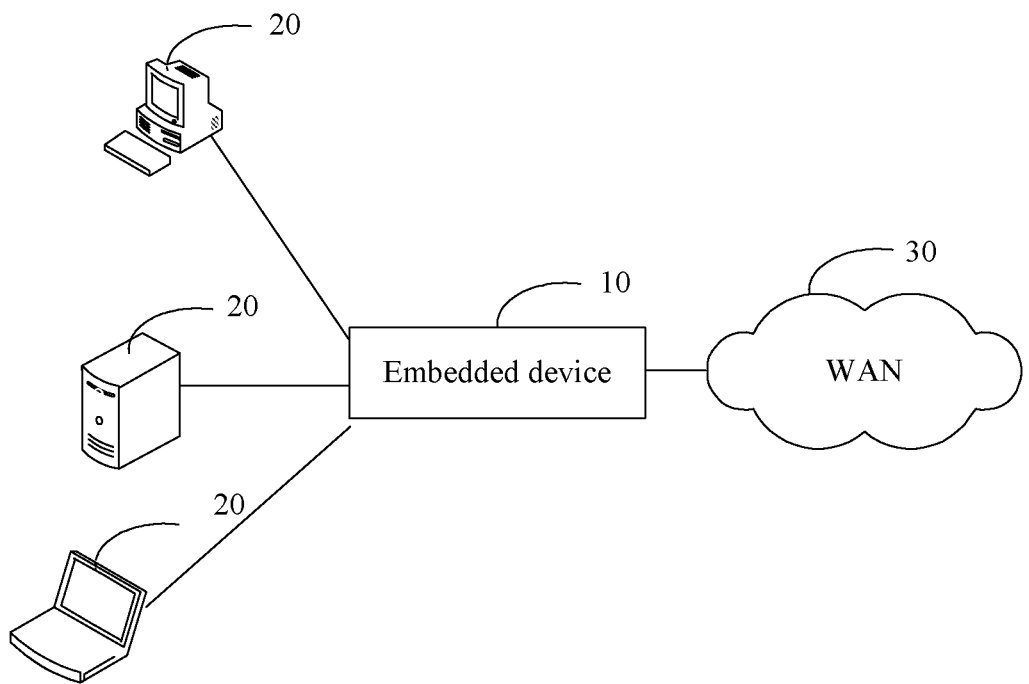
FIG. 1 is an environment of one exemplary embodiment of an embedded device in accordance with one embodiment of the present disclosure.

Referring to FIG. 1, an environment of an embedded device 10 is shown. The embedded device 10 may be a router, a switch, or a modem, for example. The embedded device 10 is operable to connect a plurality of terminal devices 20 to a wide area network (WAN) 30. In one embodiment, the embedded device 10 receives packets from the plurality of terminal devices 20, classifies and forwards the packets to the WAN 30. The plurality of terminal devices 20 may be personal computers, hyper text transfer protocol (HTTP) servers, or file transfer protocol (FTP) servers, for example. The packets may include data packets for real-time streaming multimedia applications, such as such as voice over IP, online games and IP-TV, for example.

Figure 2:
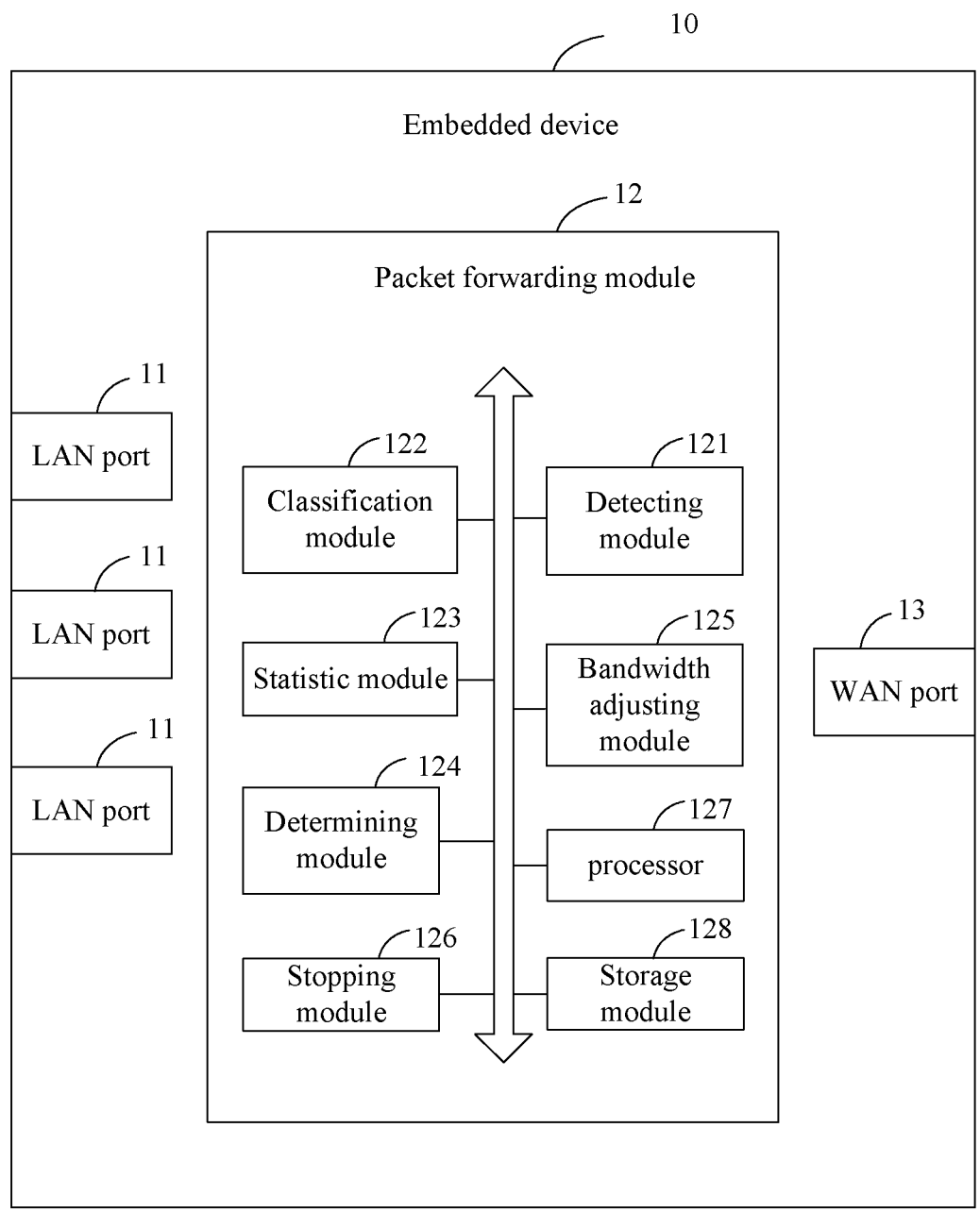
FIG. 2 is a schematic diagram of one exemplary embodiment of functional modules of an embodiment of the embedded device according to the present disclosure.

Referring to FIG. 2, a schematic diagram of functional modules of an embodiment of the embedded device 10 is shown. The embedded device 10 comprises a WAN port 13, a plurality of local area network (LAN) ports 11, and a packet forwarding module 12. The packet forwarding module 12 forwards packets from the LAN ports 11 to the WAN port 13. The packet forwarding module 12 comprises a detecting module 121, a classification module 122, a statistic module 123, a determining module 124, a bandwidth adjusting module 125, a stopping module 126, a processor 127, and a storage module 128.

The aforementioned modules 121-126 may include one or more computerized instructions stored in the storage module 128 and executed by the processor 127.

The detecting module 121 detects whether any packets are being dropped in the WAN port 13, and if the packets are being dropped in the WAN port 13, turns on a bandwidth classification mechanism. In one embodiment, status of the bandwidth classification mechanism may be indicated by a flag set by the detecting module 121. For example, when the bandwidth classification mechanism turns off, the flag is set to 0, and when the bandwidth classification mechanism turns on the flag is set to 1.

The classification module 122 classifies the packets received from the LAN ports 11 into different types, when the bandwidth classification mechanism turns on. In one embodiment, the classification module 122 classifies the packets based on a destination IP address or a destination port. That is, the packets are classified based on different users, to make sure each user is served by the embedded device 10.

The statistic module 123 determines the amount of traffic for each type of packet every fixed time period. For example, referring to FIG. 3, the statistic module 123 counts five A packets, three B packets, and one C packet, in the fixed time period.

The determining module 124 compares whether the traffic of each type of packet exceeds a predefined threshold. The determining module 124 regards the packets within the predefined threshold as normal packets, and the packets exceeding the predefined threshold as abuse packets. For example, referring to FIG. 3, the threshold may be predefined as 2, then the determining module 124 regards two of the A packets as normal packets, and three as abuse packets, and regards two of the B packets as normal, one as abuse, and regards all of the C packets as normal because the number of C packets is within the threshold. In other embodiments, the threshold is variable according to different bandwidths. In one embodiment, "abuse packets" are define to include packets that occupy too much bandwidth.

The bandwidth adjusting module 125 drops the abuse packets, and forwards the normal packets to the WAN port 13. For example, referring to FIG. 3, the bandwidth adjusting module 125 forwards the normal two A packets, two B packets, and one C packet to the WAN port 13, and drops the abuse three A packets and one B packet.

The stopping module 126 determines whether any abuse packets are being dropped by the bandwidth adjusting module 125, and turns off the bandwidth classification mechanism, if no abuse packets are being dropped.

Figure 4:
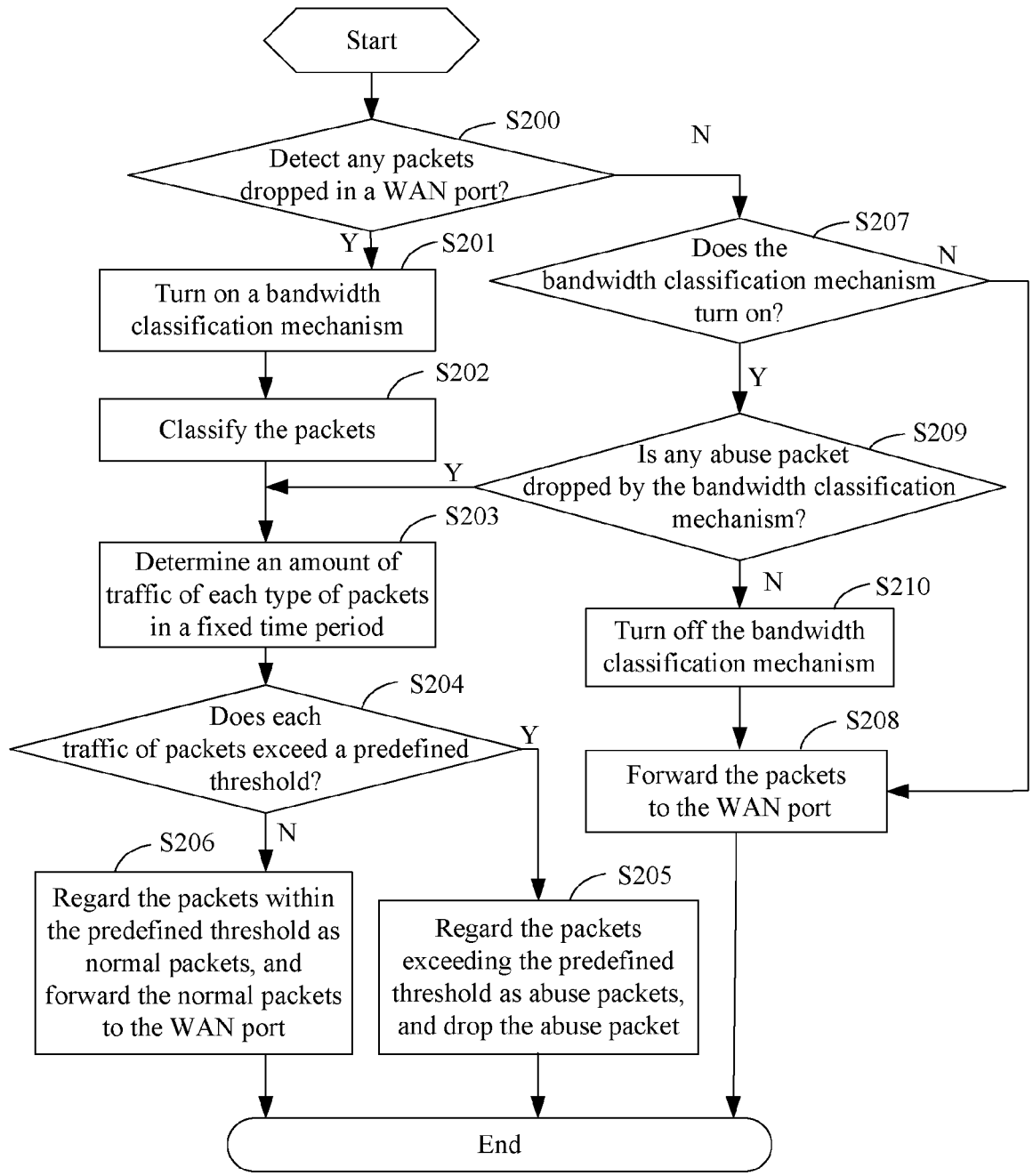
FIG. 4 is a flowchart of one exemplary embodiment of a packet forwarding method in accordance with the present disclosure.
Figure 5:
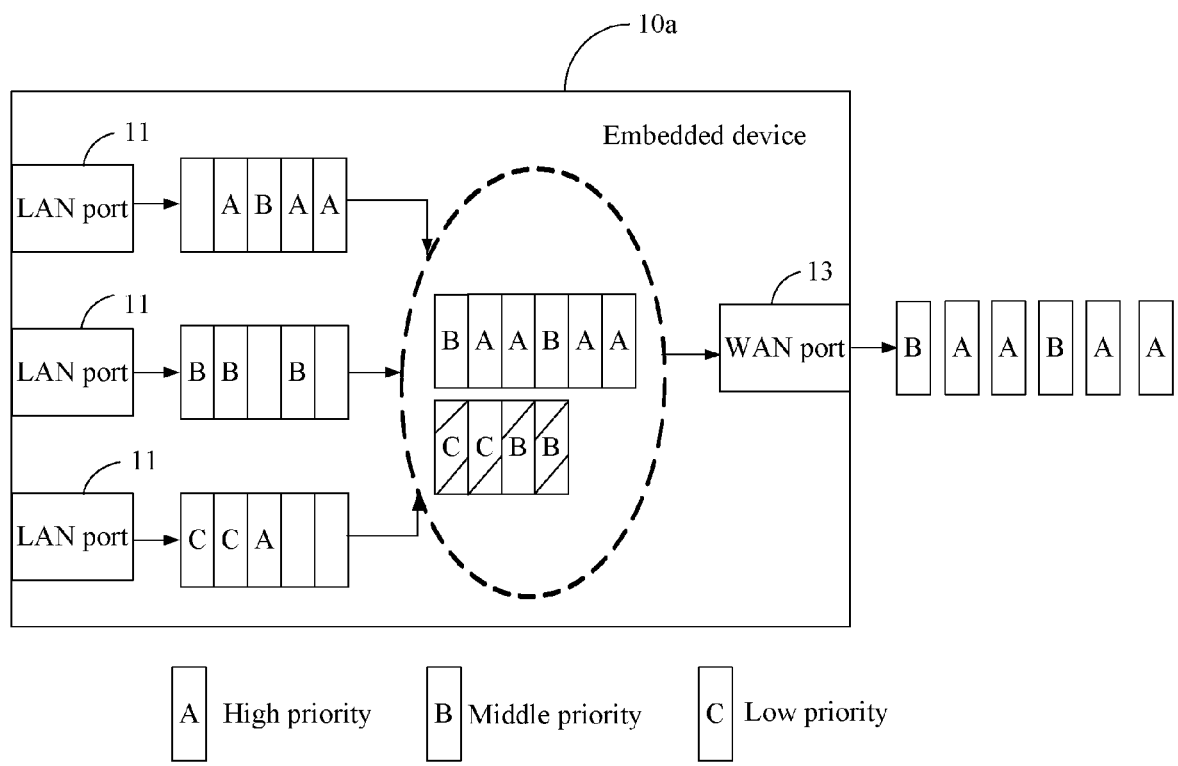
FIG. 5 is a schematic diagram of one exemplary embodiment showing a traditional embedded device forwarding packets.

Referring to FIG. 4, a flowchart of one exemplary embodiment of a packet forwarding method is shown. In one embodiment, the packet forwarding method is accomplished by functional modules of the embedded device 10 shown in the FIG. 2. Depending on the embodiment, additional blocks may be added, others deleted, and the ordering of the blocks may be changed.

In block S200, the detecting module 121 detects whether any packets are being dropped in the WAN port 13. In one embodiment, the packets are being dropped when the WAN 30 occurs to network congestion.

If the packets are being dropped in the WAN port 13, in block S201, the detecting module 121 turns on a bandwidth classification mechanism. In one embodiment, status of the bandwidth classification mechanism may be indicated by a flag set by the detecting module 121. For example, when the bandwidth classification mechanism turns off the flag is set to 0, and when the bandwidth classification mechanism turns on the flag is set to 1.

In block S202, the classification module 122 classifies the packets from the LAN ports 11 into different types. In one embodiment, classifying the packets is based on a destination IP address or a destination port. That is, the classification is based on the user's network experience, to make sure each network service is guaranteed.

In block S203, the statistic module 123 determines the amount of traffic for each type of packet in a fixed time period.

In block S204, the determining module 124 compares whether the traffic of each type of packet exceeds a predefined threshold.

In block S205, the determining module 124 regards the packets within the predefined threshold as normal packets, the bandwidth adjusting module 125 forwards the normal packets to the WAN port 13. In other embodiments, the threshold is variable according to different bandwidths. In one embodiment, the term of abuse packets means some packets to occupy too much bandwidth.

If the traffic of any type of packets exceeds the predefined threshold, in block S206, the determining module 124 regards the packets exceeding the predefined threshold as abuse packets, and the bandwidth adjusting module 125 drops the abuse packets.

Figure 3:
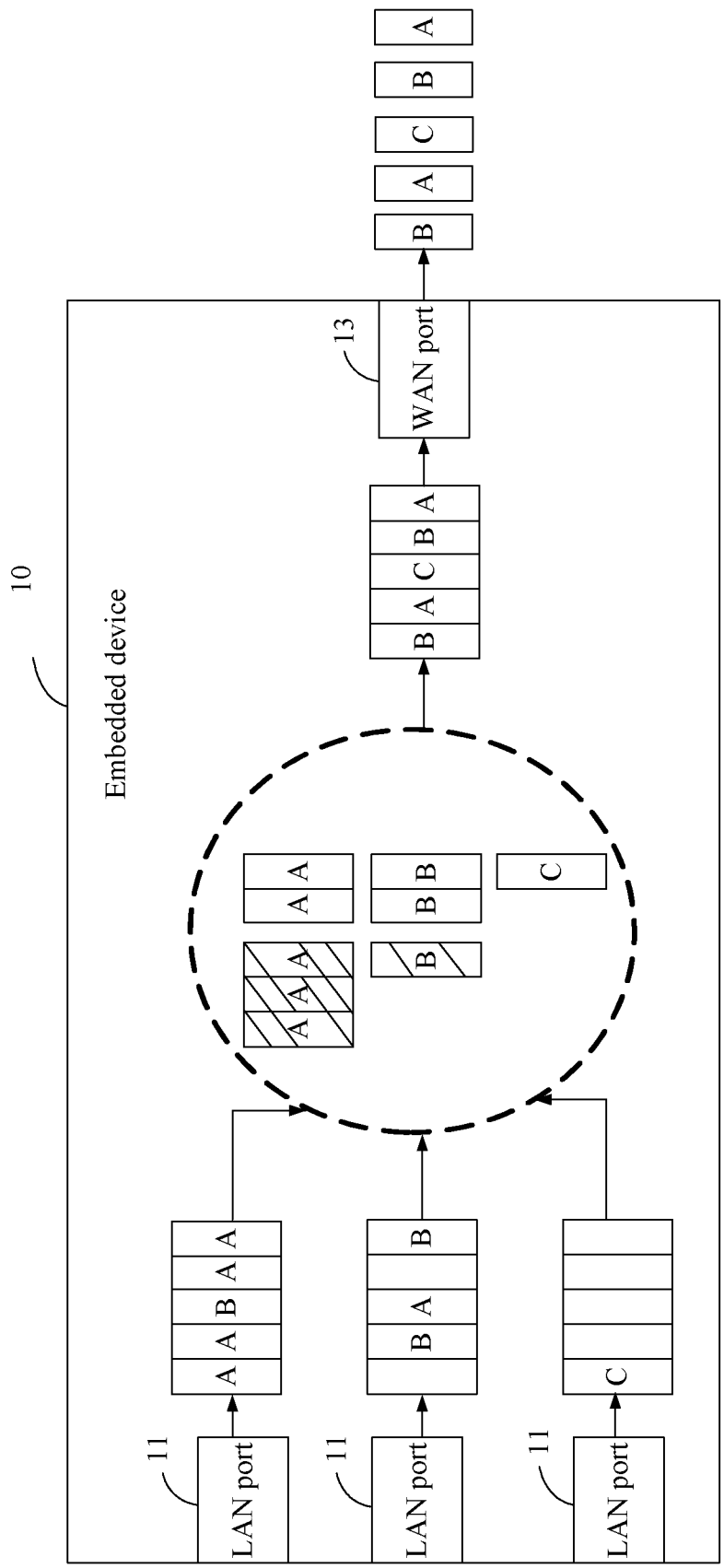
FIG. 3 is schematic diagram of one exemplary embodiment showing the embedded device forwarding packets in accordance with one embodiment of the present disclosure.

In one embodiment, when the WAN 30 occupies network congestion, that is, the abuse packets are being dropped in the LAN ports 11, as shown in FIG. 3, all types of packets share the bandwidth of the WAN 30 fairly, to improve the user experience of the network service.

If the packets are not being dropped in the WAN port 13, in block S207, the stopping module 126 determines whether the bandwidth classification mechanism turns on.

If the bandwidth classification mechanism turns off, in block S208, the bandwidth adjusting module 125 forwards the packets to the WAN port 13, as usual.

If the bandwidth classification mechanism turns on, in block S209, the stopping module 126 determines whether any abuse packets are being dropped by the bandwidth adjusting module 125.

If there are abuse packets to be dropped, the bandwidth classification mechanism stays on and the flow turns to block S203.

If no abuse packets are be dropped by the bandwidth adjusting module 125, in block S210, the stopping module 126 turns off the bandwidth classification mechanism, and then block S208 is repeated, to forward the packets to the WAN port 13.

In one embodiment, when network congestion does not occupy in the WAN 30, that is, no packets from the LAN ports 11 are being dropped in the WAN port 13, the embedded device 10 turns off the bandwidth classification mechanism. Thus, the packet forwarding efficiency of the embedded device 10 is improved.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A packet forwarding method, applied in an embedded device, the embedded device comprising a wide area network (WAN) port, a plurality of local area network (LAN) ports, and a packet forwarding module for forwarding packets from the LAN ports to the WAN port, wherein the packet forwarding method comprises:

detecting whether any packets are being dropped in the WAN port;

if the packets are being dropped in the WAN port, turning on a bandwidth classification mechanism, and classifying packets from the LAN ports into different types;

if no packets are being dropped in the WAN port, determining whether the bandwidth classification mechanism turns on;

if the bandwidth classification mechanism turns off, forwarding the packets to the WAN port;

if the bandwidth classification mechanism turns on, determining whether any abuse packets are being dropped by the bandwidth classification mechanism;

if no abuse packets are being dropped by the bandwidth classification mechanism, turning off the bandwidth classification mechanism;

if the abuse packets are being dropped by the bandwidth classification mechanism, staying on the bandwidth classification mechanism;

determining a mount of traffic for each type of packet in a fixed time period;

comparing whether the traffic of each type of packet exceeds a predefined threshold, wherein the predefined threshold is variable according to a current used bandwidth of the embedded device;

regarding the packets within the predefined threshold as normal packets, and forwarding the normal packets to the WAN port; and regarding the packets exceeding the predefined threshold as abuse packets, and dropping the abuse packets.

2. The packet forwarding method as claimed in claim 1, wherein the embedded device is selective one of a router, a switch, and a modem.

3. The packet forwarding method as claimed in claim 1, wherein the packets is classified based on a selective one of a destination Internet protocol (IP) address and a destination port.

* * * * *